March 29, 1960 P. H. NETHERWOOD 2,930,714
METHOD OF IMPREGNATING POLYTETRAFLUOROETHYLENE
MATERIAL WITH N-VINYL CARBAZOLE
Filed March 5, 1959
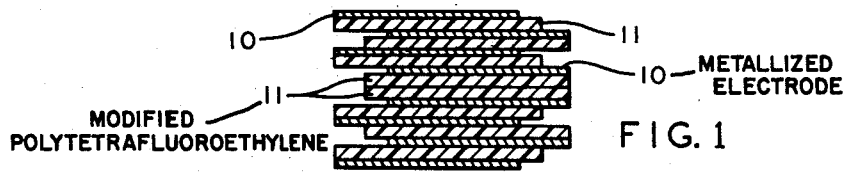
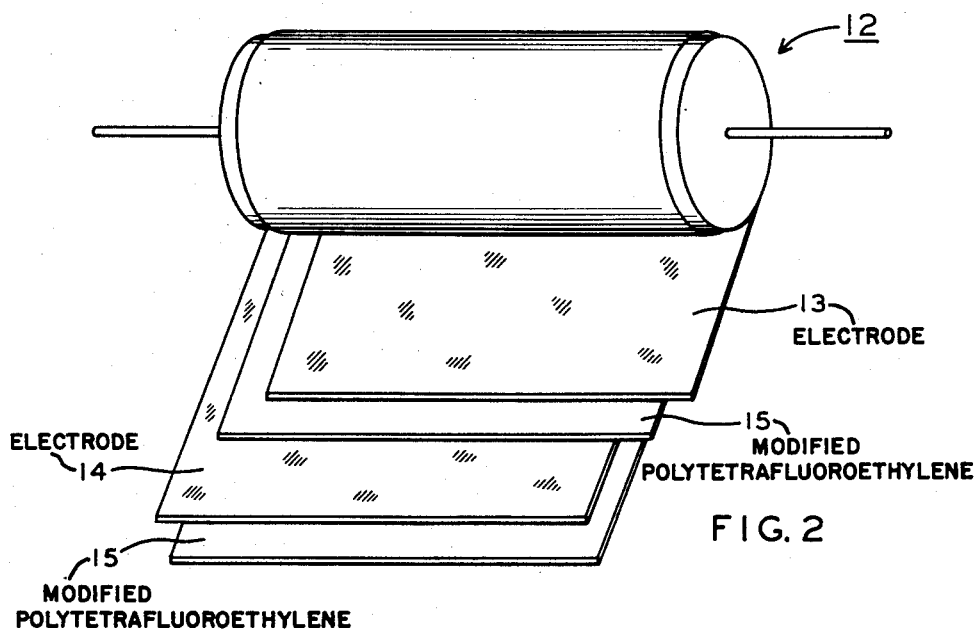
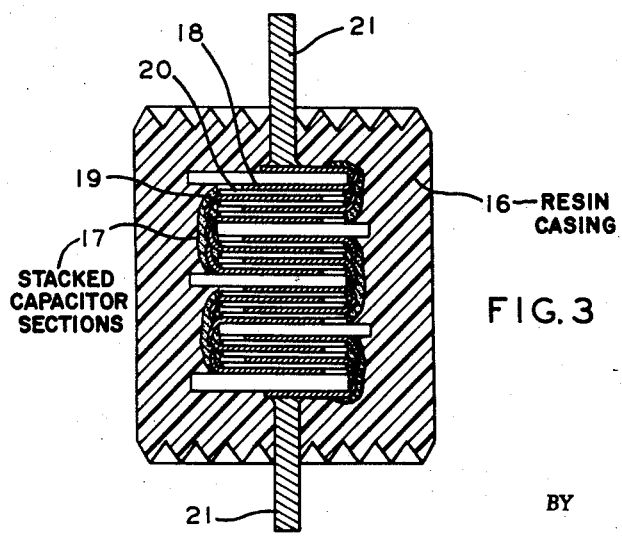
INVENTOR
PAUL H. NETHERWOOD
BY Connolly and Hutz
HIS ATTORNEYS

United States Patent Office 2,930,714
Patented Mar. 29, 1960

2,930,714

METHOD OF IMPREGNATING POLYTETRAFLUOROETHYLENE MATERIAL WITH N-VINYL CARBAZOLE

Paul H. Netherwood, Williamstown, Mass., assignor to Sprague Electric Company, North Adams, Mass., a corporation of Massachusetts Application March 5, 1959, Serial No. 797,392

3 Claims. (Cl. 117—122)

The present invention relates to polytetrafluoroethylene polymers treated so as to present a special surface, and more particularly to polytetrafluoroethylene adherent bodies. This application is a continuation-in-part of Ser. No. 386,389 which was filed on October 15, 1953, and which was abandoned after the filing of this application.

Polytetrafluoroethylene polymers have presented scientists in a variety of fields with the properties of these resins. These resins have been used in a great many applications both of an electrical and a physical nature. As an example of this, electrostatic capacitors are made utilizing polytetrafluoroethylene resinous spacing materials. This same resin has been used quite widely for valve packings, gaskets and the like. The utility of resinous materials of the type indicated has been limited by the difficulty of attaching these materials to any other material. Since the common adhesives do not satisfactorily adhere to these resins, it has been virtually impossible heretofore to anchor polytetrafluoroethylene materials to other structural elements. It is advantageous to be able to adhere polytetrafluoroethylene to other materials, such as for example, attaching a film of polytetrafluoroethylene to layers in an electrical capacitor.

To overcome this difficulty, it has been proposed to incorporate fillers in the polytetrafluoroethylene compositions during their preparation, because fillers provide teeth for adhesives. However, the use of fillers has the disadvantages that both the chemical resistance and mechanical strength of the resin is impaired.

It is an object of this invention to overcome the foregoing and related disadvantages of the prior art.

A further object of the invention is to provide polytetrafluoroethylene resinous films and bodies with surfaces which can be easily adhered to other materials.

It is still a further object of this invention to provide a dielectric spacer of polytetrafluoroethylene film for electrical capacitors having adhesion for contiguous bodies.

Still another object of this invention is to provide an electrical capacitor containing a film of polytetrafluoroethylene film attached to other layers of the capacitor.

The above as well as still further advantages of the present invention will be more completely understood from the following description taken together with the accompanying drawing in which:

Fig. 1 is a sectional view of the layers of the metallized film capacitor containing polytetrafluoroethylene spacers according to this invention;

Fig. 2 is a perspective view of a partially unrolled capacitance section showing a polytetrafluoroethylene spacer and an electrode foil; and Fig. 3 is a sectional view of a capacitor made up of a stack of capacitor sections including a dielectric spacer according to this invention.

The objects of this invention are attained by impregnating a polytetrafluoroethylene resinous material with n-vinyl carbazole. The n-vinyl carbazole is resinifiable to form a different resin, and is at least partially resinified in situ. The impregnated polytetrafluoroethylene shows a sticky adhesive surface that readily adheres to other surfaces when pressed against another surface, such as paper, or another identical impregnated resin member. The two members will be permanently united by a resin bond.

The resinous materials can be obtained commercially from a variety of sources, and the manner of preparation is now a matter of public record and well recognized. The resins employed with the invention are preferably polymerized to a substantial extent so that the molecular weight of the individual polymer chains is at least 10,000. The specific bodies of resin treated in accordance with this disclosure may be molecularly oriented as by stretching if desired, but this is not necessary. The polytetrafluoroethylene polymer treated with impregnant according to this invention can be incorporated in a composite body without further laminating procedures. For example, the impregnated polytetrafluoroethylene can be incorporated in a composite dielectric of a capacitor.

The impregnation of this invention takes place at the surface of the polytetrafluoroethylene resin. It has been found that the impregnation does not penetrate much more than about 20 mils (thousandths of an inch) into the polytetrafluoroethylene resin. For this penetration a prolonged impregnation, 72 or more hours, is usually needed, unless pressures of about 1000 or more pounds per square inch (gauge) are used. However, a penetration of only two or three mils in a resin having a thickness of as much as 40 mils is exceedingly effective in providing the desired results.

This invention is applicable to sheets and films of polytetrafluoroethylene and also to bodies having polytetrafluoroethylene surfaces. The polytetrafluoroethylene can be impregnated at the surface of the film tape or body; or, in the case of thin films, substantially the entire polytetrafluoroethylene resin can be impregnated according to the present invention. As pointed out in greater detail below, this invention finds application in the treatment of the surface of various articles.

The impregnation may be of an entire film of polytetrafluoroethylene, in which case the preferred range of film thickness is from about 1 to about 10 mils. A particularly desirable film for treatment is the type produced by extrusion, and an approximately 2 mil extruded polytetrafluoroethylene marketed by the Minnesota Mining and Manufacturing Company of St. Paul, Minnesota, is very effective.

In forming the new products of the invention, it is best to cover the specific resin being treated with a layer of a monomeric or uncondensed, or a partially polymerized or condensed liquid as will be indicated below, and then to heat the so-covered resin at an elevated temperature below its transition point and below the point at which any material degree of polymerization of the liquid indicated takes place. During this treatment, a pressure of at least 30 pounds per square inch gauge is maintained upon the reaction of the ingredients for a period dependent upon the pressure maintained during the impregnation phase. The speed of the treatment indicated will vary with all of the variables possible with the invention. In general, the higher the temperature, the greater the pressure, the shorter the time for impregnation required. At least a few hours of impregnation is required unless the pressure used reaches 1000 pounds per square inch, when as little as ten minutes will be enough for a two or three mil penetration. The impregnation can be further aided by mechanical vibration of the resin such as effected by ultrasonic generators, thus, additionally shortening the period required. The minimum temperatures for impregnation at practical rates appears to be room temperature (20° C.) or slightly lower.

After the impregnation step above, the surfaces produced on polytetrafluoroethylene resins may be used directly for a variety of applications. The tacky surface produced by this impregnation step is keyed into the polytetrafluoroethylene material and is tenaciously held on the polytetrafluoroethylene resin. A sticky surface is thus provided on the ordinary sintered Teflon material. The products treated in this manner may be suitably adhered to other surfaces previously not attachable to a sintered Teflon surface.

The following is an example of the formation of the products of the invention. This example is not to be considered as limiting the scope of the inventive concept herein set forth in any regard.

Example I

A 10 mil thick polytetrafluoroethylene film purchased from E. I. du Pont de Nemours & Company, Inc., of Wilmington, Del., was treated with n-vinyl carbazole for a period of 72 hours at a temperature of 80° C. and a pressure of 30 pounds per square inch gauge. At the end of this time this resinous film was polymerized by heating for 18 hours at 150° C.

A polytetrafluoroethylene film as prepared according to the example has a variety of applications to practice. One of these is the incorporation of the film as a dielectric spacer in a capacitor. For example, it has been found that the invention may be advantageously used in the formation of metallized polytetrafluoroethylene dielectric sheets. Referring to Fig. 1, a section shows a series of interleaved metallized electrodes 10 on dielectric spacers 11 made up of polytetrafluoroethylene film treated with n-vinyl carbazole according to this invention. The complex components are prepared by impregnating the surface of a continuous film 11 of polytetrafluoroethylene with the n-vinyl carbazole in the method set forth in the example. The impregnant is partially polymerized at a temperature sufficient for this purpose but below a temperature at which the monomer tends to decompose on the surface of the film. A metallized coating is applied as by cathode sputtering, spraying or the like. The electrode 10 adheres to the surface, whereas the same metallized layers will not adhere satisfactorily to untreated polytetrafluoroethylene films.

The treated polytetrafluoroethylene film of the example may also be incorporated in a convolutely wound capacitor comprised of a pair of foil electrodes between which is interposed a dielectric made up of the treated polytetrafluoroethylene of this invention. Fig. 2 shows a capacitor section 12 of convolutely wound layers of material of this nature. The layers of material are a pair of foil electrodes 13 and 14 between which is interposed dielectric of polytetrafluoroethylene films 15. The films 15 have been previously treated according to this invention as specifically disclosed in Example I. The foils 13 and 14 adhere to the sticky surfaces of the films 15. The convolutely wound capacitance section 12 are wound on each other with the films 15 interposed between them. As shown in the drawing the foil electrodes 13 and 14 are wound in extended foil fashion. The overlapping concentric turns of the foils are each separated from simple and adjacent turns of the foils by turns of the treated dielectric film.

A simpler embodiment of the film of this invention is illustrated in Fig. 3 in which a body 16 of a suitable enclosing material such as a moldable resin contains a series connected stack of capacitor sections 17. Each section 17 is composed of foils 18 and 19 interleaved with each other. The adjacent foils 18 and 19 are spaced from each other by sheets 20 of the impregnated polytetrafluoroethylene. The sheets 20 project on all sides an appreciable distance beyond the region in which the foils 18 and 19 overlap each other. In the assembly of the foils 18 and 19 and the sheets 20 the foils adhere to the sticky surface of the impregnated film. The assemblies are impregnated by additional n-vinyl carbazole which fills the voids and spaces in the sections 16 and 17 and covers all exposed surfaces. The entire stack is encased in the resin mass 16 which can be moldable in such a way as to leave the outer ends of the studs 21 projecting from the terminal foils of the foils 18 and 19 respectively. These projecting ends of the studs 21 can be used as terminals for the capacitor.

Other possible modifications and embodiments of the invention are found in the use of an impregnated polytetrafluoroethylene body as an end seal plug in a container for a component such as a capacitor. A plug having a treated surface and which adheres to the walls of a suitable container provides great stability to terminal shock and a maintainance of a strong adherence to the walls of the container under all conditions including very low temperatures. This closure eliminates the need of an end seal gasket in a closure of the capacitors and other components. Polytetrafluoroethylene is particularly useful as end seal because of its low affinity for surface moisture. By the use of a properly sealed polytetrafluoroethylene end plug the danger of moisture penetration through the seal is reduced as moisture on the end of the closure plug cannot be retained on a polytetrafluoroethylene end plug.

An electrical tape may be formed from a thin film of impregnated polytetrafluoroethylene. The tape may be prepared with one surface modified according to this invention, and as such has many applications. One such application is the sealing together of the ends of a wall capacitor containing a dielectric which is difficult to adhere to such as untreated polytetrafluoroethylene.

This invention provides a tacky or sticky coating on polytetrafluoroethylene film of an adhesive quality which was unapproached previous to applicant's discovery. This invention is particularly applicable to the extruded, sintered polytetrafluoroethylene of at least 10,000 molecular weight. A further advantage of this invention is found in the attainment of the adhesive coating on unfilled polytetrafluoroethylene film.

It will be understood that the above-described embodiments are set forth for the purpose of illustrating the invention and that further modifications may be made without departing from the spirit and the scope hereof. It is to be understood that the invention is limited only by the scope of the appended claims.

What is claimed is:

1. A process of producing a tacky surface upon an unfilled polytetrafluoroethylene resinous material of a molecular weight of over 10,000 which comprises covering said resinous material with a tacky surface by applying liquid n-vinyl carbazole and subjecting said so-covered resinous material for a period sufficient to cause penetration of the said n-vinyl carbazole into the said resin base to a pressure of at least 30 p.s.i. guage at a temperature of at least 20° C. to about 120° C.; and further polymerizing the n-vinyl carbazole to produce a sticky, tacky, covered polytetrafluoroethylene material receptive to adhesion.

2. A process of preparing a tacky surface upon an unfilled polytetrafluoroethylene resinous material for reception of a metal coating which comprises covering the surface of unfilled polytetrafluoroethylene resinous material of a molecular weight of over 10,000 which comprises covering the surface of unfilled polytetrafluoroethylene resinous material of a molecular weight of at least 10,000 with a tacky surface by applying liquid n-vinyl carbazole and subjecting said covered polytetrafluoroethylene resinous material for a period of 72 hours or more to an elevated temperature under a gauge pressure of the order of two atmospheres to cause penetration of the n-vinyl carbazole into the polytetrafluoroethylene resinous material and subsequently further polymerizing the n-vinyl carbazole impregnated material to produce a sticky, tacky covering on said polytetrafluoroethylene material receptive to adhesion.

3. A process of preparing a tacky surface upon an unfilled polytetrafluoroethylene resinous material for reception of a metal coating which comprises covering the surface of unfilled polytetrafluoroethylene resinous material of a molecular weight of at least 10,000 with a tacky surface by applying liquid n-vinyl carbazole and subjecting said covered polytetrafluoroethylene resinous material for a period of 72 hours or more to an elevated temperature under a gauge pressure of the order of 2 atmospheres to cause penetration of the n-vinyl carbazole into the polytetrafluoroethylene resinous material and subsequently further polymerizing the n-vinyl carbazole to produce a sticky, tacky covered polytetrafluoroethylene film receptive to adhesion by a metallized layer.

References Cited in the file of this patent

UNITED STATES PATENTS

| | | |
|---|---|---|
| 2,684,307 | Knapman | July 20, 1954 |
| 2,694,650 | Herman | Nov. 16, 1954 |
| 2,725,312 | Schell | Nov. 29, 1955 |

FOREIGN PATENTS

| | | |
|---|---|---|
| 540,940 | Great Britain | Nov. 6, 1941 |